(12) United States Patent
Zakrzewska et al.

(10) Patent No.: US 11,523,285 B2
(45) Date of Patent: Dec. 6, 2022

(54) CHANNEL SELECTION IN WIRELESS NETWORK

(71) Applicant: Nokia Solutions and Networks Oy, Espoo (FI)

(72) Inventors: Anna Zakrzewska, Dublin (IE); Lester Ho, Dublin (IE)

(73) Assignee: Nokia Solutions and Networks OY, Espoo (FI)

( * ) Notice: Subject to any disclaimer, the term of this patent is extended or adjusted under 35 U.S.C. 154(b) by 84 days.

(21) Appl. No.: 16/768,510

(22) PCT Filed: Dec. 10, 2018

(86) PCT No.: PCT/EP2018/084230
§ 371 (c)(1),
(2) Date: May 29, 2020

(87) PCT Pub. No.: WO2019/137716
PCT Pub. Date: Jul. 18, 2019

(65) Prior Publication Data
US 2020/0389798 A1 Dec. 10, 2020

(30) Foreign Application Priority Data
Jan. 12, 2018 (FI) .................................... 20185033

(51) Int. Cl.
*H04W 16/14* (2009.01)
*H04W 16/02* (2009.01)
*H04W 72/04* (2009.01)

(52) U.S. Cl.
CPC ............ *H04W 16/14* (2013.01); *H04W 16/02* (2013.01); *H04W 72/0453* (2013.01); *H04W 72/0486* (2013.01)

(58) Field of Classification Search
None
See application file for complete search history.

(56) References Cited

U.S. PATENT DOCUMENTS

2011/0292897 A1    12/2011  Wu et al.
2012/0113918 A1*   5/2012   Freda .................... H04W 16/14
                                                              370/329
(Continued)

FOREIGN PATENT DOCUMENTS

WO    WO 2016/171873 A1    10/2016

OTHER PUBLICATIONS

Minyoung Park, "IEEE 802.11ac: Dynamic Bandwidth Channel," IEEE International Conference on Communications, XP031908841, pp. 1-5, Jun. 5-9, 2011.

(Continued)

*Primary Examiner* — Nicholas Sloms
(74) *Attorney, Agent, or Firm* — Fay Sharpe LLP (57) ABSTRACT

This document discloses a solution for performing channel selection for a wireless network. According to an aspect, a method comprises: detecting, by a first network node, at least a second network node; determining, by the first network node, a primary channel of the second network node and a set of channel bonding configurations supported by the second network node, wherein the set of channel bonding configurations defines one or more configurations for combining the primary channel with auxiliary channels; determining, by the first network node, channel utilisation factors of the second network node for a set of frequency channels by using the set of channel bonding configurations; and selecting, by the first network node, a primary channel on the basis of the channel utilisation factors.

13 Claims, 4 Drawing Sheets

(56) References Cited

U.S. PATENT DOCUMENTS

| | | | |
|---|---|---|---|
| 2013/0188565 A1* | 7/2013 | Wang | H04J 11/003 |
| | | | 370/329 |
| 2015/0078298 A1* | 3/2015 | Barriac | H04W 40/02 |
| | | | 370/329 |
| 2015/0163769 A1* | 6/2015 | Lee | H04W 72/04 |
| | | | 370/329 |
| 2015/0208330 A1* | 7/2015 | Park | H04W 76/10 |
| | | | 370/338 |
| 2015/0249990 A1 | 9/2015 | Kadiyala et al. | |
| 2015/0271748 A1 | 9/2015 | Seok | |
| 2016/0088631 A1* | 3/2016 | Hedayat | H04B 7/063 |
| | | | 370/329 |
| 2016/0316455 A1* | 10/2016 | Asterjadhi | H04W 74/0816 |
| 2016/0316473 A1 | 10/2016 | Wang et al. | |
| 2017/0026970 A1* | 1/2017 | Pack | H04W 72/0426 |
| 2018/0092029 A1* | 3/2018 | Canpolat | H04W 24/02 |
| 2019/0045508 A1* | 2/2019 | Cariou | H04W 72/0446 |

OTHER PUBLICATIONS

Surachai Chieochan et al., "Channel Assignment Schemes for Infrastructure-Based 802.11 WLANs: A Survey," IEEE Communications Surveys & Tutorials, vol. 12, No. 1, p. 124-136, First Quarter 2010.

International Search Report for PCT/EP2018/084230 dated Feb. 28, 2019.

* cited by examiner

CHANNEL SELECTION IN WIRELESS NETWORK

FIELD

Various embodiments described herein relate to a field of wireless communications and, particularly, to improving performing channel selection in a wireless network.

BACKGROUND

On some frequency bands, e.g. unlicensed frequency bands, multiple wireless networks may operate on the same frequency band. When a number of overlapping wireless networks supporting the same operational frequencies increases, efficient frequency channel selection becomes an important factor in terms of performance of the wireless networks.

BRIEF DESCRIPTION

According to an aspect, there is provided the subject matter of the independent claims.

Some embodiments are defined in dependent claims.

According to an aspect, there is provided a method for channel selection comprising: detecting, by a first network node, at least a second network node; determining, by the first network node, a primary channel of the second network node and a set of channel bonding configurations supported by the second network node, wherein the set of channel bonding configurations defines one or more configurations for combining the primary channel with auxiliary channels; determining, by the first network node, channel utilisation factors of the second network node for a set of frequency channels by using the set of channel bonding configurations; and selecting, by the first network node, a primary channel on the basis of the channel utilisation factors.

According to another aspect, there is provided an apparatus for a first network node of a wireless network, the apparatus comprising at least one processor and at least one memory including a computer program code, wherein the at least one memory and the computer program code are configured, with the at least one processor, to cause the apparatus to: detect at least a second network node; determine a primary channel of the second network node and a set of channel bonding configurations supported by the second network node, wherein the set of channel bonding configurations defines one or more configurations for combining the primary channel with auxiliary channels; determine channel utilisation factors of the second network node for a set of frequency channels by using the set of channel bonding configurations; and select a primary channel for the first network node on the basis of the channel utilisation factors.

In an embodiment, the at least one memory and the computer program code are configured, with the at least one processor, to cause the first network node to select a frequency channel associated with one or more channel utilisation factors below one or more thresholds as the primary channel. In an embodiment, the at least one memory and the computer program code are configured, with the at least one processor, to cause the first network node to select, as the primary channel, a frequency channel mapped to a channel utilisation factor associated with the lowest channel utilisation.

In an embodiment, the channel bonding configurations supported by the second network node define a channel structure for each bandwidth supported by the second network node.

In an embodiment, the at least one memory and the computer program code are configured, with the at least one processor, to cause the first network node to perform said selecting gradually in an order of decreasing bandwidth of channel bonding configurations supported by the first network node.

In an embodiment, the at least one memory and the computer program code are configured, with the at least one processor, to cause the first network node to perform said selecting by: forming frequency channel groups from the set of frequency channels such that each frequency channel group has the determined bandwidth; selecting, amongst the channel utilisation factors of each frequency channel group, the channel utilisation factor associated with the highest channel utilisation to represent the frequency channel group; and selecting, as the primary channel, a frequency channel of a frequency channel group having a channel utilisation factor associated with the lowest channel utilisation amongst the frequency channel groups.

In an embodiment, the at least one memory and the computer program code are configured, with the at least one processor, to cause the first network node to further perform the following: detecting at least a third network node; determining a primary channel of the third network node and a set of channel bonding configurations supported by the third network node; determining channel utilisation factors of third network node for the set of frequency channels by using the set of channel bonding configurations supported by the third network node; computing channel load factors for the plurality of frequency channels by combining the channel utilisation factors of the second network node and the third network node; and selecting the primary channel on the basis of the channel load factors.

In an embodiment, the at least one memory and the computer program code are configured, with the at least one processor, to cause the first network node to assign the same channel utilisation factor for all operating channels of the second network node, if the second network node supports only one channel bonding configuration.

In an embodiment, the at least one memory and the computer program code are configured, with the at least one processor, to cause the first network node to assign, if the second network node supports multiple channel bonding configurations, multiple channel utilisation factors to channels of the second network node such that the same value of the channel utilisation factor is assigned to frequency channels of the same channel bonding configuration and the values of the channel utilisation factors have correlation with associated bandwidths of the channel bonding configurations.

According to yet another aspect, there is provided an apparatus for the first network node, comprising: means for determining a primary channel of the second network node and a set of channel bonding configurations supported by the second network node, wherein the set of channel bonding configurations defines one or more configurations for combining the primary channel with auxiliary channels; means for determining channel utilisation factors of the second network node for a set of frequency channels by using the set of channel bonding configurations; and means for selecting a primary channel for the first network node on the basis of the channel utilisation factors.

According to yet another aspect, there is provided computer program product embodied on a distribution medium readable by an apparatus or a computer program distribution medium comprising program instructions which, when loaded into the apparatus, execute a computer process comprising: detecting, in a first network node, at least a second network node; determining, in the first network node, a primary channel of the second network node and a set of channel bonding configurations supported by the second network node, wherein the set of channel bonding configurations defines one or more configurations for combining the primary channel with auxiliary channels; determining, in the first network node, channel utilisation factors of the second network node for a set of frequency channels by using the set of channel bonding configurations; and selecting, in the first network node, a primary channel on the basis of the channel utilisation factors.

LIST OF DRAWINGS

Various embodiments are described below, by way of example only, with reference to the accompanying drawings, in which.

DESCRIPTION OF EMBODIMENTS

The following embodiments are examples. Although the specification may refer to "an", "one", or "some" embodiment(s) in several locations, this does not necessarily mean that each such reference is referring to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
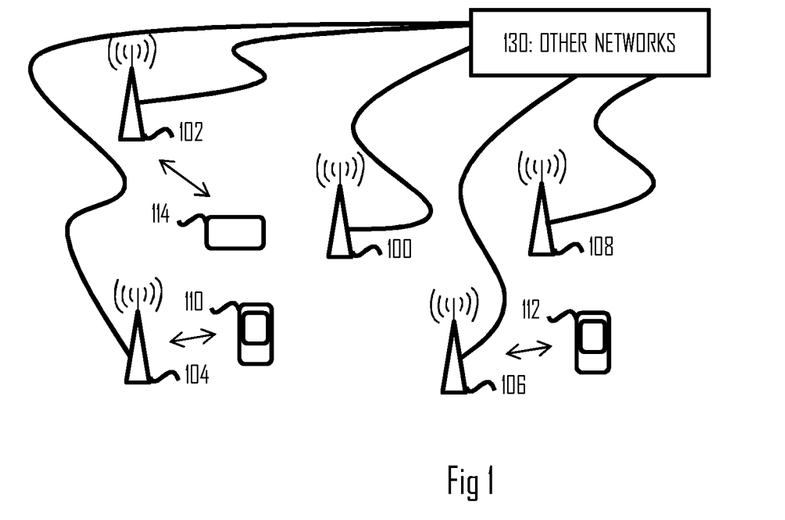
FIG. 1 illustrates an example of a wireless communication scenario to which embodiments of the invention may be applied.

A general wireless communication scenario to which embodiments of the invention may be applied is illustrated in FIG. 1. FIG. 1 illustrates wireless communication devices comprising access points (AP) 100 to 108 and a plurality of wireless terminal devices (STA) 110, 112, 114. The access point may be associated with a basic service set (BSS) which is a basic building block of an IEEE 802.11-based wireless local area network (WLAN). The most common BSS type is an infrastructure BSS that includes a single AP together with all STAs associated with the AP. The AP may be a fixed AP or it may be a mobile AP. The AP may also provide access to other networks 130, e.g. the Internet. In another embodiment, the BSS may comprise a plurality of APs to form an extended service set (ESS). In yet another embodiment, a terminal device may establish and manage a peer-to-peer wireless network to which one or more other terminal devices may associate. In such a case, the peer-to-peer wireless network may be established between two terminal devices and, in some embodiment, the terminal device managing the network may operate as an access node providing the other terminal device(s) with a connection to other networks, e.g. the Internet. In other embodiments, such routing functionality is not employed and the connection terminates in the terminal devices. Such a peer-to-peer network may be utilized for data sharing or gaming, for example. Therefore, a collective term for the access points, access nodes, and terminal devices is a network node.

While embodiments of the invention are described in the context of the above-described topologies of IEEE 802.11 specifications, it should be appreciated that these or other embodiments of the invention may be applicable to networks based on other specifications, e.g. other versions of the IEEE 802.11, WiMAX (Worldwide Interoperability for Microwave Access), UMTS LTE (Long-term Evolution for Universal Mobile Telecommunication System), LTE-Advanced, a fifth generation cellular communication system (5G), and other networks having cognitive radio features, e.g. transmission medium sensing features and adaptiveness to coexist with radio access networks based on different specifications and/or standards. Some embodiments may be applicable to networks having features defined in the IEEE 802.19.1 specification. One example of a suitable communications system is the 5G system, as mentioned above. 5G is envisaged to use multiple-input-multiple-output (MIMO) multiantenna transmission techniques, many more base stations or nodes than current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum. One of the RATs may be a WLAN-based RAT. 5G mobile communications will have a wider range of use cases and related applications including video streaming, augmented reality, different ways of data sharing, and various forms of machine type applications, including vehicular safety, different sensors and real-time control.

IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac amendment extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. In the context of IEEE 802.11ac, definition of primary N MHz channel and its secondary channel is used. For example, an 80 MHz bandwidth is formed by a 40 MHz primary channel and associated 40 MHz secondary channel, while a 40 MHz bandwidth is formed by a 20 MHz primary channel and associated 20 MHz secondary channel. However, let us for the sake of simplicity use an auxiliary channel as the common term to refer to the secondary, tertiary and/or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. This may include a clear-channel assessment (CCA) procedure in which a channel is sensed for radio energy. If radio energy exceeding a threshold is detected on the channel, the channel is considered to be occupied by another transmitter. Otherwise, the channel may be considered as clear for acquisition of the TXOP. The network node may use the CCA procedure on both the primary channel and on the auxiliary channels to determine availability of the secondary channels for increased bandwidth within the TXOP.

System specifications may set predefined rules for channel bonding which defines how auxiliary channel(s) can be combined with each primary channel. Each primary channel may have a fixed pattern of auxiliary channels for different bandwidths. Table 1 below illustrates one pattern for channel bonding for one primary channel. P denotes a primary channel and A denotes an auxiliary channel

TABLE 1

| Bandwidth | Channel # | | | | | | | |
|---|---|---|---|---|---|---|---|---|
| | 36 | 40 | 44 | 48 | 52 | 56 | 60 | 64 |
| 20 MHz | | | A | P | | | | |
| 40 MHz | A | | | P | | | | |
| 80 MHz | | | P | | | | A | |
| 160 MHz | | | | | P | | | |

Referring to Table 1, a network node operating on a determined primary channel may select the auxiliary channel from above and/or below the primary channel, depending on the channel bonding configuration associated with the selected primary channel.

Some network nodes may employ fixed bandwidth operation, and such a network node may be forced to sense the whole bandwidth to be idle before carrying out frame transmission. In 802.11ac, a concept of dynamic channel bandwidth (DCB) operation was introduced. Rather than transmitting only when the selected primary channel and associated auxiliary channels are idle, a network node employing the DCB firstly determines which of the channels are available and, then, selects the appropriate bandwidths. For example, rather than waiting for the full 80 MHz channel to become idle before transmitting, the network node is able to "fall back" to a smaller bandwidth (e.g. 40 or 20 MHz) when the full channel is busy. The network node is thus able to opportunistically transmit on the 80 MHz bandwidth when all the channels forming the 80 MHz bandwidth are available, but still fall back and transmit when part of the channels are being used.

As the channel bonding rules define the channel bonding patterns, the selection of the primary channel has an impact on the overall spectral efficiency. Poor selection of the primary channel that causes the use of certain, associated auxiliary channels may result in a situation where some channels become congested while other channels remain idle in a case of overlapping networks.

Figure 2:
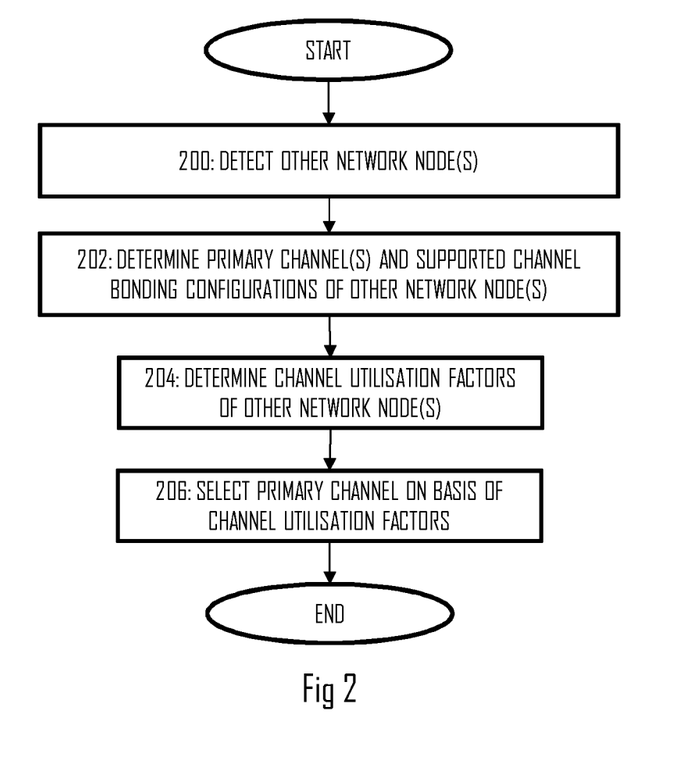
FIG. 2 illustrates a flow diagram of an embodiment for selecting a primary channel for a wireless network.

FIG. 2 illustrates an embodiment of a process for selecting a primary channel for a wireless network. Referring to FIG. 2, the process comprises: detecting (block 200), by a first network node, at least a second network node; determining (block 202), by the first network node, a primary channel of the second network node and a set of channel bonding configurations supported by the second network node, wherein the set of channel bonding configurations defines one or more configurations for combining the primary channel with auxiliary channels; determining (block 204), by the first network node, channel utilisation factors of second network node for a set of frequency channels by using the set of channel bonding configurations; and selecting (block 206), by the first network node, a primary channel on the basis of the channel utilisation factors.

The first network node thus takes the channel bonding configurations and the channel utilisation factors of the detected other network node(s) into account when selecting the primary channel. This enables the selection such that the first network node may avoid or reduce overlapping channel usage.

In an embodiment, the first network node further takes into account the channel bonding configurations supported by the first network node.

In an embodiment, the first network node builds a channel utilisation table comprising aggregated channel utilisation for all detected network nodes. In an embodiment, the channel utilisation table is updated as the first network node detects new network nodes and/or as detected network nodes change their primary channels or stop operating. Accordingly, the first network node may maintain an up-to-date channel utilisation table. The channel utilisation table thus provides an overall picture of current channel utilisation which can readily be used for selecting a primary channel that is associated with a channel bonding configuration that provides an acceptable performance under the prevailing conditions.

In an embodiment, the channel utilisation table is in a matrix form comprising channel numbers on one of the rows and columns and supported bandwidths on the other one of the rows and columns. In the embodiments described below, the bandwidths are in rows and the channel numbers in columns. Instead of channel numbers, other channel identifiers may be used.

The process of FIG. 2 may be carried out when the network node initiates a wireless network or when the network node changes a primary channel. A reason for changing the primary channel may be observed congestion or degradation in provided grade of service, for example.

Figure 3:
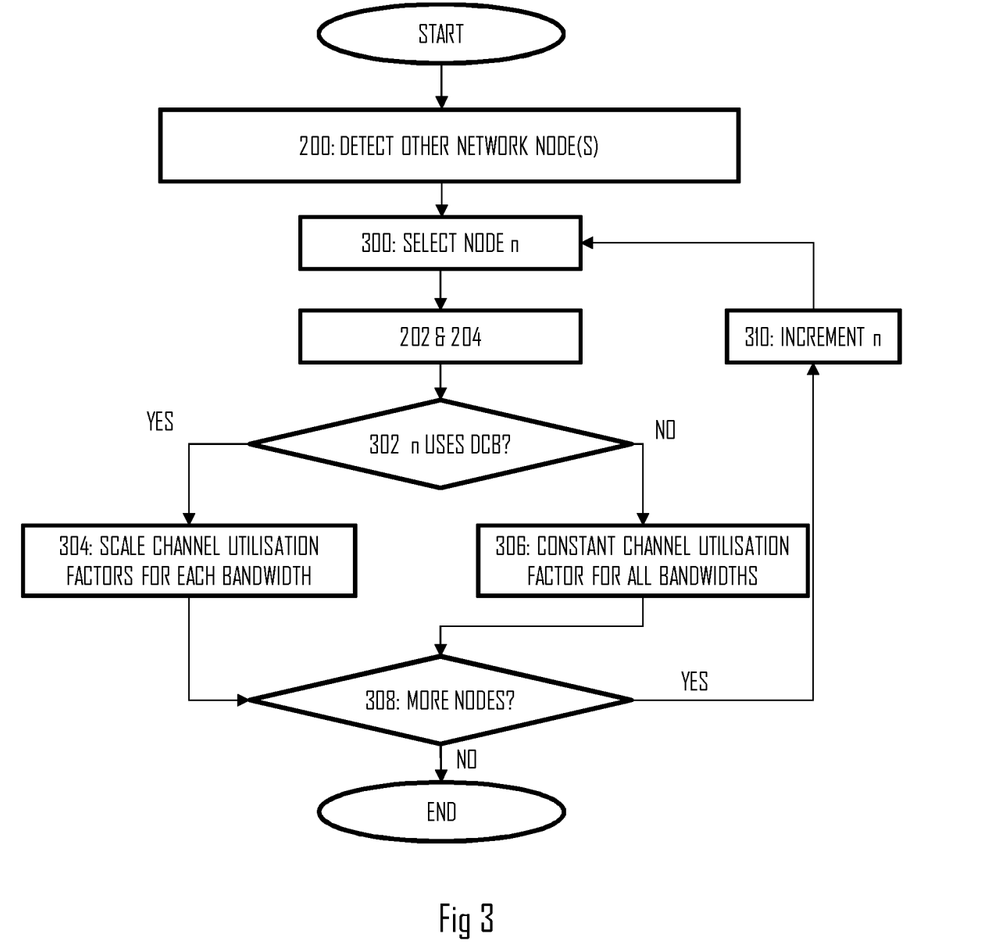
FIG. 3 illustrates an embodiment of a process for building a channel utilisation table in a network node.

FIG. 3 illustrates an embodiment of building the channel utilisation table by a network node, e.g. the first network node. Referring to FIG. 3, the network node first detects the other network nodes (block 200). Then, the network node fills the channel utilisation table one detected network node at a time, as illustrated in FIG. 3, or in parallel processing where multiple detected access nodes are entered to the table in parallel.

In block 300, the network node selects the first detected network node (n=1) and performs blocks 202 and 204. Let us assume that the network node detects four other network nodes AP1, AP2, AP3, AP4 with respective channel utilisation factors [0.8, 0.4, 0.6, 0.4] and primary channels [1, 8, 3, 6]. Regarding the channel utilisation factors, the channel utilisation may be measured by the network node. In another embodiment, the network nodes may signal a load or another metric that may be used to implicitly indicate channel utilisation. The channel utilisation may be indicated in terms of ratio of channel usage with respect to full channel usage, e.g. the channel utilisation factor may have values between zero (no channel usage) and one (channel used all the time).

In block 302, the network node determines whether or not the network node n supports the dynamic channel bonding (DCB). Let us assume that the network node n uses the DCB and, as a consequence, the process proceeds to block 304 where the network node scales the bandwidth utilisation factor of the network node n (0.8 in this case) for each bandwidth in the channel utilisation table. The scaling may be performed such that the channel utilisation factors entered on each row (bandwidth) have correlation with the corresponding bandwidth. A basic assumption is that the channel utilisation factor for a network node supporting the DCB is for the narrowest supported bandwidth (only the primary channel usage), e.g. 20 MHz in 802.11 networks. When the network node n has a higher bandwidth available, it can reduce the channel utilisation because of higher bandwidth. Accordingly, the scaling provide the correlation between the channel utilisation factors and the bandwidths such that the channel utilisation factor is lower for a higher bandwidth. It may have linear correlation, as illustrated in Table 2 below. Table 2 illustrates the channel utilisation table after block 304.

TABLE 2

| Bandwidth | Channel # | | | | | | | |
|---|---|---|---|---|---|---|---|---|
| | 1 | 2 | 3 | 4 | 5 | 6 | 7 | 8 |
| 20 MHz | 0.8 | 0 | 0 | 0 | 0 | 0 | 0 | 0 |
| 40 MHz | 0.4 | 0.4 | 0 | 0 | 0 | 0 | 0 | 0 |
| 80 MHz | 0.2 | 0.2 | 0.2 | 0.2 | 0 | 0 | 0 | 0 |
| 160 MHz | 0.1 | 0.1 | 0.1 | 0.1 | 0.1 | 0.1 | 0.1 | 0.1 |

Table 2 illustrates eight channels for the sake of simplicity of description. The actual number of channels and their indices may depend on the implementation. Table 2 also illustrates channel bandwidth levels or channel bonding levels in rows. These levels are discussed in greater detail below.

In block 308, the network node determines whether or not there are more detected network nodes still to be entered to the table. In our example, there are so the process proceeds to block 310 where n is incremented (n=2) and, then, returns to block 300. Let us assume that the subsequent network node 2 utilises static channel bonding on a 20 MHz band and operates on channel 8 with channel utilisation factor 0.4, as described above. Accordingly, the process proceeds from block 302 to block 306. In block 306, the network node assigns a constant channel utilisation factor for all bandwidths in the channel utilisation table. In other words, since the network node 2 cannot adapt its bandwidth, it occupies its primary channel 8 with the constant channel utilisation. As a result, Table 2 is modified into the following form of Table 3:

TABLE 3

| Bandwidth | Channel # | | | | | | | |
|---|---|---|---|---|---|---|---|---|
| | 1 | 2 | 3 | 4 | 5 | 6 | 7 | 8 |
| 20 MHz | 0.8 | 0 | 0 | 0 | 0 | 0 | 0 | 0.4 |
| 40 MHz | 0.4 | 0.4 | 0 | 0 | 0 | 0 | 0 | 0.4 |

TABLE 3-continued

| Bandwidth | Channel # | | | | | | | |
|---|---|---|---|---|---|---|---|---|
| | 1 | 2 | 3 | 4 | 5 | 6 | 7 | 8 |
| 80 MHz | 0.2 | 0.2 | 0.2 | 0.2 | 0 | 0 | 0 | 0.4 |
| 160 MHz | 0.1 | 0.1 | 0.1 | 0.1 | 0.1 | 0.1 | 0.1 | 0.5 |

As illustrated in Table 3, the channel utilisation in each element of the table is an aggregate of channel utilisations of different network nodes operating on the same channel. Hence, the channel utilisation on channel 8 is a superposition (a sum) of the channel utilisation of network node 2 (0.4) and network node 1 (0.1) when using the largest supported bandwidth. Accordingly, the channel utilisation factors may equally be called channel load factors because they illustrate the channel load on each bandwidth level.

Then, the next network node (n=3) is taken into consideration. Let us assume that the network node 3 uses the DCB, has channel utilisation factor 0.6 and primary channel 3, as described above. Accordingly, Table 3 is modified into the following form as a result of block 304:

TABLE 4

| Bandwidth | Channel # | | | | | | | |
|---|---|---|---|---|---|---|---|---|
| | 1 | 2 | 3 | 4 | 5 | 6 | 7 | 8 |
| 20 MHz | 0.8 | 0 | 0.6 | 0 | 0 | 0 | 0 | 0.4 |
| 40 MHz | 0.4 | 0.4 | 0.3 | 0.3 | 0 | 0 | 0 | 0.4 |
| 80 MHz | 0.35 | 0.35 | 0.35 | 0.35 | 0 | 0 | 0 | 0.4 |
| 160 MHz | 0.175 | 0.175 | 0.175 | 0.175 | 0.175 | 0.175 | 0.175 | 0.575 |

Notice that the Table 4 illustrates different channel bonding configurations for the primary channels 1 and 3. On channel 1, all the auxiliary channels are on channels higher than the primary channel (i.e. channels 2 to 8), while channel 3 is associated with a channel bonding configuration where the auxiliary channels are both higher (i.e. channels 4 to 8) and lower (i.e. channels 1 to 2) to the primary channel, depending on the bandwidth. With the definition 'higher', it is meant that the higher channels are located on higher frequencies than the primary channel. With the definition 'lower', it is meant that the lower channels are located on lower frequencies than the primary channel.

Then, let us take the last network node (n=4) into consideration. The network node 4 uses a 40 MHz channel in a static manner which causes execution of block 306. Accordingly, by using the channel utilisation factor 0.4 and primary channel 6, Table 4 is updated into the following form:

TABLE 5

| Bandwidth | Channel # | | | | | | | |
| --- | --- | --- | --- | --- | --- | --- | --- | --- |
| | 1 | 2 | 3 | 4 | 5 | 6 | 7 | 8 |
| 20 MHz | 0.8 | 0 | 0.6 | 0 | 0 | 0.4 | 0.4 | 0.4 |
| 40 MHz | 0.4 | 0.4 | 0.3 | 0.3 | 0 | 0.4 | 0.4 | 0.4 |
| 80 MHz | 0.35 | 0.35 | 0.35 | 0.35 | 0 | 0.4 | 0.4 | 0.4 |
| 160 MHz | 0.175 | 0.175 | 0.175 | 0.175 | 0.175 | 0.575 | 0.575 | 0.575 |

When all the detected network nodes have been entered to the channel utilisation table (NO in block 308), the process ends.

Figure 4:
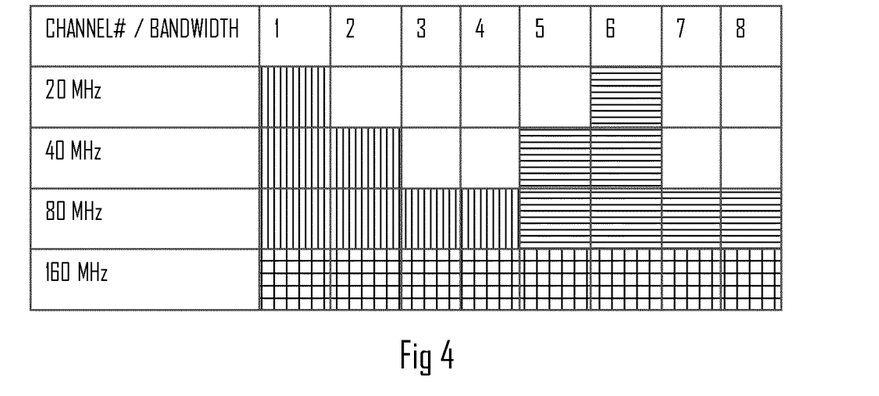
FIG. 4 illustrates an embodiment of channel bonding patterns.

As described above, the channel bonding configurations supported by the second network node define a channel structure for each bandwidth supported by the second network node. The tables above and FIG. 4 illustrate examples of different channel structures for different primary channels. As illustrated in FIG. 4, when a network node selects primary channel 1, it is configured to select the auxiliary channel(s) according to the channel bonding pattern of channel 1. When starting from the basic bandwidth (20 MHz in the example of FIG. 4) of the primary channel, the auxiliary channel for the next higher bandwidth (40 MHz) is channel 2. Auxiliary channels for the next higher bandwidth (80 MHz) are channels 2, 3, and 4, and auxiliary channels for the next higher bandwidth (160 MHz) are channels 2 to 8, as illustrated with the vertical pattern. When a network node selects primary channel 6, it is configured to select the auxiliary channel(s) according to the channel bonding pattern of channel 6. When starting from the basic bandwidth (20 MHz in the example of FIG. 4) of the primary channel 6, the auxiliary channel for the next higher bandwidth (40 MHz) is channel 5. Auxiliary channels for the next higher bandwidth (80 MHz) are channels, 5, 7 and 8, and auxiliary channels for the next higher bandwidth (160 MHz) are channels 1 to 5, 7, and 8, as illustrated with the horizontal pattern.

Figure 5:
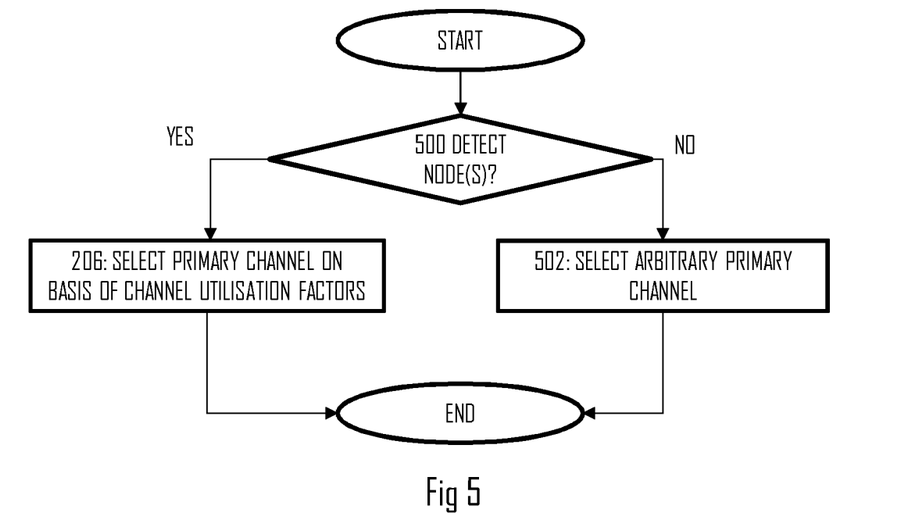
FIG. 5 illustrates an embodiment for selecting the primary channel for the wireless network.
Figure 6:
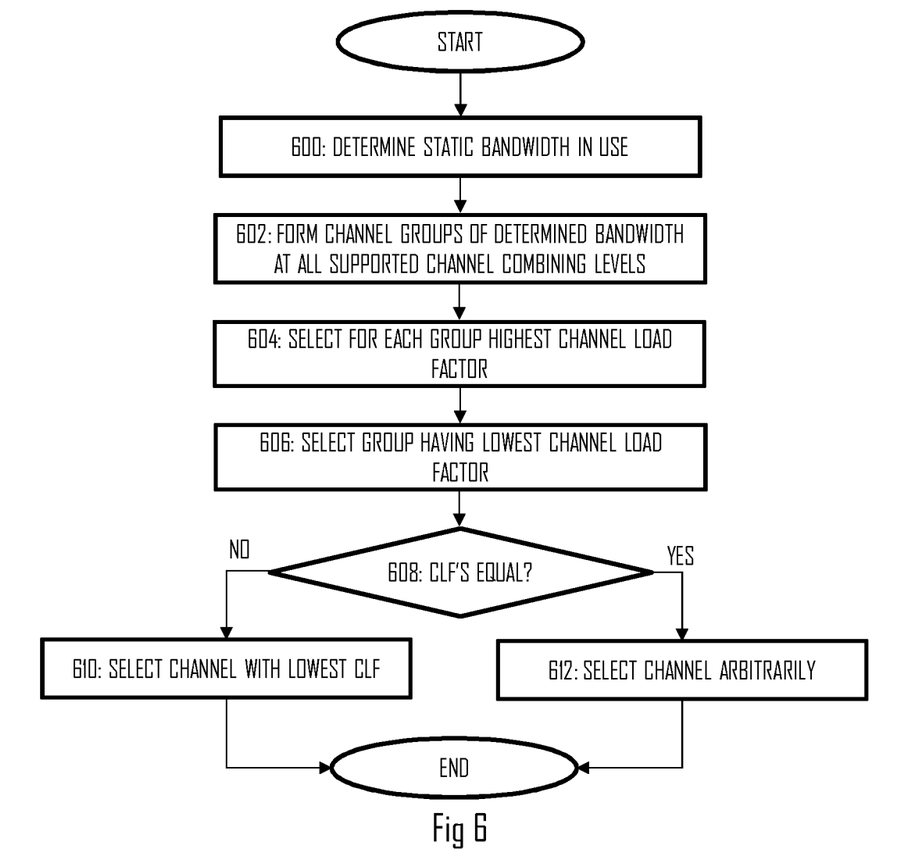
FIG. 6 illustrates an embodiment for selecting the primary channel for a wireless network supporting static channel bonding.
Figure 7:
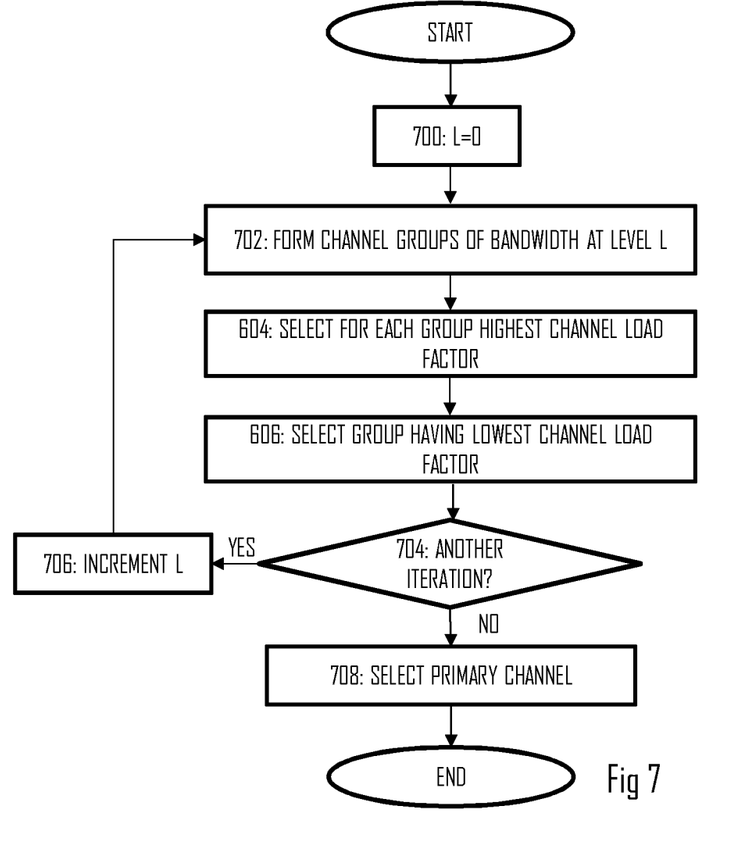
FIG. 7 illustrates an embodiment for selecting the primary channel for a wireless network supporting dynamic channel bonding.

Now, let us consider some embodiments of block 206 with reference to FIGS. 5 to 7. FIG. 5 illustrates an embodiment where a network node performs block 206 only upon detecting at least one other network node in block 500. If no network nodes are detected in block 200, for example, the network node may select the primary channel arbitrarily.

FIG. 6 illustrates an embodiment of block 206 for a network node employing a static channel bonding configuration. The network node may support only one channel bonding configuration, or it may be able to change the static bonding configuration but not dynamically. The change may include resetting a wireless network managed by the network node, e.g. disconnecting all associations in the wireless network.

Referring to FIG. 6, the network node may first determine the static bandwidth in use (block 600). This may be a fixed parameter, as described above, or the network node may select the static bandwidth from a set of supported bandwidths for use in a static manner. The selection may be based on estimated throughput need, for example.

Upon selecting the bandwidth, e.g. 40 MHz, the network node groups the channel load factors of the channel utilisation table into channel groups of this bandwidth (block 602). For example, upon selecting the 40 MHz bandwidth the network node forms channel groups of channels that together form the 40 MHz bandwidth. Referring to Tables 2 to 5, the network node may form the following channel groups: [1, 2], [3, 4], [5, 6] and [7, 8]. All channel load/utilisation factors are also grouped by using this grouping. The grouping of channels may be aligned with the preset channel bonding configurations so the network node may omit channel groups that are not supported by the channel bonding configurations. The exemplary grouping is based on that a 40-MHz channel cannot be formed by a channel group [2, 3] because it is not a supported channel bonding configuration. Preset channel bonding configurations may refer to regulated or standardized channel bonding configurations defined by system specifications.

In embodiments free of any preset channel bonding configurations, the network node may form channel groups from all possible channel combinations, contiguous and/or non-contiguous. By using the same example of channels 1 to 8, the network node may form 40-MHz channel groups such as [1, 2], [2, 3], [1, 3], [1, 4], . . . .

In block 604, the network node performs group-wise processing by selecting from each group a channel load factor (CLF) that is associated with the highest channel load. Accordingly, the highest channel load factor is selected from each channel group to represent the channel group. In block 606, the network node selects a channel group that is represented by a channel load factor associated with the lowest channel load. Thereafter, the network node selects the primary channel amongst the channels of the selected channel group. In block 608, it is determined whether or not the highest channel load factor of each channel of the selected channel group are equal. If yes, the process proceeds to block 612 where the primary channel is selected arbitrarily from the channels of the channel group selected in block 606. If no in block 608, the process proceeds to block 610 where a channel associated with a minimum amongst the highest channel load factors is selected as the primary channel. In other words, the network node selects the primary channel that has the lowest channel load.

Let us consider some examples of the process of FIG. 6 with reference to Tables 2 to 5. Network node 2 (n=2) above uses the static channel bonding and 20 MHz bandwidth, so let us consider a scenario where the network node uses the channel utilisation table of Table 2 when selecting the primary channel. Since the bandwidth supported by the network node 2 is the same as the bandwidth of a channel, the channels 1 to 8 are allocated to different groups 1 to 8 in block 602. In block 604, the network node 2 selects the highest channel utilisation factor for each column (channel), resulting in the following set of channel load factors: [0.8, 0.4, 0.2, 0.2, 0.1, 0.1, 0.1, 0.1]. Amongst these, channels 5 to 8 are represented by the lowest channel load factors 0.1, so blocks 606, 608, and 612 may in this case be combined such that the network node may select any one of the channels 5 to 8 arbitrarily.

Network node 4 (n=4) also uses the static channel bonding but 40 MHz bandwidth, so let us consider a scenario where the network node 4 uses the channel utilisation table of Table 4 when selecting the primary channel. Since the network node 4 supports channel bonding of two channels, the channels are grouped into channel groups of two channels, e.g. [1, 2], [3, 4], [5, 6] and [7, 8] in block 602. In block 604, the network node 4 selects the highest channel load factor for each channel group, yielding [0.8, 0.6, 0.175, 0.575]. The channel group of channels [5, 6] has the lowest maximum channel load factor 0.175 so the channel group [5, 6] is selected in block 606. As the channel load factors of channels 5 and 6 are equal in Table 4, the network node 4 performs block 612.

Referring to the Tables where the channels are provided in columns and channels are being grouped, the processing of FIG. 6 may be called column-wise selection of the primary channel.

Let us then, with reference to FIG. 7, consider an embodiment of performing the selection of the primary channel for a network node that supports the DCB. Referring to FIG. 7, the network node supporting the DCB may first initialise a parameter L representing a bandwidth level, e.g. a row in the channel utilisation table (any one of Tables 2 to 5). L=0 may represent the lowest level and the highest bandwidth in the table, e.g. bandwidth 160 MHz in Tables 2 to 5.

In block 702, the network node forms channel groups, each group formed by channels that together form the bandwidth associated with level L. For example, for L=0 in Tables 2 to 5, 160 MHz channel groups are formed. Channels 1 to 8 thus form one group, channels 9 to 16 would form the next group (if illustrated), etc. Now, channel load factors for each group are taken only from the level L. Referring to Table 3, the channel load factors for the channel group formed from channels 1 to 8 would be [0.1, 0.1, 0.1, 0.1, 0.1, 0.1, 0.1, 0.5]. Now, blocks 604 and 606 may be carried out in the above-described manner. Accordingly, the highest channel load factor per group is selected in block 604, e.g. 0.5 for the channel group of channels 1 to 8 from Table 3. Then, the channel group having the lowest maximum channel load factor is selected in block 606.

Now, it is determined in block 704 whether or not another iteration is needed. In an embodiment, all the levels L are processed. In another embodiment, the process may stop before all the levels have been processed, for example if all the channels of the selected channel group have the same channel load factor at level L and all levels above level L. If no more iterations is needed, the primary channel may be selected in block 708 amongst the channels of the selected channel group, e.g. as described above in connection with blocks 608 to 612. However, if another iteration is needed, the process proceeds to the next level by incrementing L (block 706) and returning to block 702. Then, the processing proceeds to the next level having a lower bandwidth, e.g. 80 MHz bandwidth in Table 3.

Let us again consider two examples of the process of FIG. 7 by using the Tables 2 to 5. The network node 3 (n=3) described above supports the DCB and let us assume that it uses the channel utilisation table of Table 3 when selecting the primary channel. As described above, there is only one 160 MHz band considered in this example so the channel group of channels 1 to 8 is selected in block 606. On the next level where L=1 (80 MHz), the channels are grouped from the channels selected in block 606 to form two groups each formed by channels having 80 MHz aggregate bandwidth: a first group of channels 1 to 4 and a second group of channels 5 to 8 (block 702). Values from the row/level of 80 MHz are then taken into consideration. The highest value for the first group on the level is 0.2 while the highest value for the second group on the level is 0.4 (block 604). The group having the lowest of these values is the first group (0.2<0.4) and, thus, the first group (channels 1 to 4) is selected in block 606. The channels of the selected group have different channel load factors so another iteration is needed and L is incremented in block 706. On the next level L=2 (40 MHz), again two groups are formed from the channels selected in block 606 during the previous iteration, each channel group formed by channels having an aggregate bandwidth 40 MHz. A first group is formed by channels 1 and 2 and a second group is formed by channels 3 and 4 (block 702). Values from the row/level of 40 MHz are then taken into consideration. The highest value for the first group on the level is 0.4 while the highest value for the second group on the level is 0 (block 604). The group having the lowest of these values is the second group (0<0.4) and, thus, the second group (channels 3 and 4) is selected in block 606. Since both channels 3 and 4 have an equal channel load factor, one of the channels 3 and 4 is selected.

Let us then consider a network node 5 (n=5) supporting the DCB and using Table 5 to select the primary channel. As described above, there is only one 160 MHz band considered in this example so the channel group of channels 1 to 8 is selected in block 606. On the next level where L=1 (80 MHz), the channels are grouped from the channels selected in block 606 to form two groups each formed by channels having 80 MHz aggregate bandwidth: a first group of channels 1 to 4 and a second group of channels 5 to 8 (block 702). Values from the row/level of 80 MHz are then taken into consideration. The highest value for the first group on the level is 0.35 while the highest value for the second group on the level is 0.4 (block 604). The group having the lowest of these values is the first group (0.35<0.4) and, thus, the first group (channels 1 to 4) is selected in block 606. Now channels of the selected group have the same channel load factors on level 1 but different channel load factor on higher levels so another iteration is needed and L is incremented in block 706. On the next level L=2 (40 MHz), again two groups are formed from the channels selected in block 606 during the previous iteration, each channel group formed by channels having an aggregate bandwidth 40 MHz. A first group is formed by channels 1 and 2 and a second group is formed by channels 3 and 4 (block 702). Values from the row/level of 40 MHz are then taken into consideration. The highest value for the first group on the level is 0.4 while the highest value for the second group on the level is 0.3 (block 604). The group having the lowest of these values is the second group (0.3<0.4) and, thus, the second group (channels 3 and 4) is selected in block 606. Since the channels 3 and 4 have different channel load factors, the one with the lowest channel load factor is selected as the primary channel. In this example, it would be channel 4 (0<0.6).

In the embodiments described above, the network node selects, as the primary channel, a frequency channel associated with the lowest channel load factor when considering the channel load caused by other network nodes and the channel bonding patterns. It may be construed that the network node selects as the primary channel, a frequency channel having one or more channel load factors below one or more thresholds, the thresholds are formed by the maximum channel load factors of the channel groups, as described in connection with the embodiments of FIGS. 6 and 7, for example.

The channel may be considered as a channel logically identified as a channel in the wireless network. A channel may be associated with a channel identifier or a channel index identifiable via signalling in the wireless network. According to one viewpoint, a sub-carrier of a multi-carrier signal may be excluded from the definition of the channel.

Figure 8:
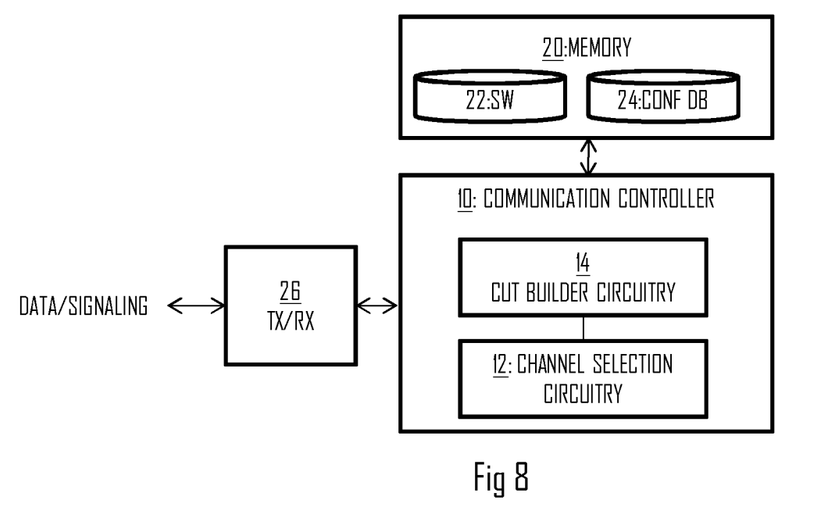
FIG. 8 illustrates a block diagram of an embodiment of an apparatus.

FIG. 8 illustrates an embodiment of a structure of an apparatus configured to perform the above-mentioned functionalities of the network node executing the process of FIG. 2 or any one of the embodiments performed by the network node. The apparatus may be the network node 100, e.g. any one of the access points 100 to 108. In another embodiment, the apparatus is suitable for the network node and may form a part of hardware and/or software of the network node. The apparatus may comply with specifications of an IEEE 802.11 network and/or another wireless network. The apparatus may be defined as a cognitive radio apparatus capable of adapting its operation to a changing radio environment, e.g. to changes in parameters of another system on the same frequency band. The apparatus may be or may be comprised in a computer (PC), a laptop, a tablet computer, a cellular phone, a palm computer, or any other apparatus provided with radio communication capability. In another embodiment, the apparatus carrying out the above-described functionalities is comprised in such a device, e.g. the apparatus may comprise a circuitry, e.g. a chip, a chipset, a processor, a micro controller, or a combination of such circuitries in the network node. The apparatus may be an electronic device comprising electronic circuitries for realizing the embodiments of the present invention.

Referring to FIG. 8, the apparatus may comprise a communication controller circuitry 10 configured to control wireless communications in the apparatus. The communication controller circuitry 10 may configure establishment and management of a wireless network provided by the network node of the apparatus. It may also control the establishment, operation, and termination of connections or associations in the wireless network.

The communication controller circuitry 10 may comprise, as subcircuitries, a channel utilisation table (CUT) builder circuitry 14 and a channel selection circuitry 12. The CUT builder circuitry may be configured to build the channel utilisation table, e.g. any one of Tables 2 to 5, according to the process of FIG. 3, for example. The CUT builder circuitry 14 may also be tasked with the update of the channel utilisation table, as the channel utilisation of the other network nodes changes. The channel selection circuitry 12 may be configured to select the primary channel according to block 206 or any one of the embodiments described in connection with FIGS. 5 to 7. The channel selection circuitry 12 may be further configured to select a channel bonding pattern associated with the selected primary channel.

The circuitries 12 and 14 of the communication controller circuitry 10 may be carried out by the one or more physical or electronic circuitries or processors. In practice, the different circuitries may be realized by different computer program modules. Depending on the specifications and the design of the apparatus, the apparatus may comprise some of the circuitries 12 and 14 or all of them.

The apparatus may further comprise a memory 20 that stores computer programs (software) 22 configuring the apparatus to perform the above-described functionalities. The memory 20 may also store a configuration database 24 comprising communication parameters and other information needed for the wireless communications, e.g. the channel utilisation table.

The apparatus may further comprise radio interface components 26 providing the apparatus with radio communication capability within one or more wireless networks. The radio interface components 26 may comprise standard well-known components such as an amplifier, filter, frequency-converter, (de)modulator, and encoder/decoder circuitries and one or more antennas. The apparatus may in some embodiments further comprise a user interface enabling interaction with the user of the communication device. The user interface may comprise a display, a keypad or a keyboard, a loudspeaker, etc.

As used in this application, the term 'circuitry' refers to all of the following: (a) hardware-only circuit implementations, such as implementations in only analogue and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a wireless device.

The processes or methods described in connection with FIGS. 2 to 7 may also be carried out in the form of a computer process defined by a computer program. The computer program may be in source code form, object code form, or in some intermediate form, and it may be stored in a transitory or a non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless networks defined above but also to other suitable wireless communication systems. The protocols used, the specifications of wireless networks, their network elements and terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method for channel selection, comprising:
   detecting, by a first network node, at least a second network node;
   determining, by the first network node, a primary channel of the second network node and a set of channel bonding configurations supported by the second network node, wherein the set of channel bonding configurations defines one or more configurations for combining the primary channel with auxiliary channels;
   determining, by the first network node, channel utilisation factors of the second network node for a set of frequency channels by using the set of channel bonding configurations; and selecting, by the first network node, a primary channel on the basis of the channel utilisation factors,
wherein the first network node performs said selecting by:
forming frequency channel groups from the set of frequency channels such that each frequency channel group has a determined bandwidth;
selecting, amongst the channel utilisation factors of each frequency channel group, the channel utilisation factor associated with the highest channel utilisation to represent the frequency channel group; and
selecting, as the primary channel, a frequency channel of a frequency channel group having a channel utilisation factor associated with the lowest channel utilisation amongst the frequency channel groups.

2. The method of claim 1, wherein the first network node uses the set of channel bonding configurations such that the channel utilisation factors are distributed, according to the set of channel bonding configurations, to the set of frequency channels occupied by the second network node.

3. The method of claim 1, wherein the first network node selects the primary channel further on the basis of channel bonding configurations supported by the first network node.

4. The method of claim 1, wherein the channel bonding configurations supported by the second network node define a channel structure for each bandwidth supported by the second network node.

5. The method of claim 1, wherein the first network node performs said selecting in an order of decreasing bandwidth of channel bonding configurations supported by the first network node.

6. The method of claim 1, further comprising by the first network node:
detecting at least a third network node;
determining a primary channel of the third network node and a set of channel bonding configurations supported by the third network node;
determining channel utilisation factors of third network node for the set of frequency channels by using the set of channel bonding configurations supported by the third network node;
computing channel load factors for the plurality of frequency channels by combining the channel utilisation factors of the second network node and the third network node; and
selecting the primary channel on the basis of the channel load factors.

7. The method of claim 1, wherein the first network node assigns the same channel utilisation factor for all operating channels of the second network node, if the second network node does not support dynamic channel bonding.

8. The method of claim 1, wherein if the second network node supports dynamic channel bonding, the first network node assigns channel utilisation factors to operating channels of the second network node such that the values of the channel utilisation factors have correlation with associated bandwidths of the channel bonding configurations.

9. An apparatus for a first network node of a wireless network, the apparatus comprising:
at least one processor; and
at least one memory including a computer program code, wherein the at least one memory and the computer program code are configured, with the at least one processor, to cause the apparatus to:
detect at least a second network node;
determine a primary channel of the second network node and a set of channel bonding configurations supported by the second network node, wherein the set of channel bonding configurations defines one or more configurations for combining the primary channel with auxiliary channels;
determine channel utilisation factors of the second network node for a set of frequency channels by using the set of channel bonding configurations; and
select a primary channel for the first network node on the basis of the channel utilisation factors,
wherein the apparatus performs said selecting by:
forming frequency channel groups from the set of frequency channels such that each frequency channel group has a determined bandwidth;
selecting, amongst the channel utilisation factors of each frequency channel group, the channel utilisation factor associated with the highest channel utilisation to represent the frequency channel group; and
selecting, as the primary channel, a frequency channel of a frequency channel group having a channel utilisation factor associated with the lowest channel utilisation amongst the frequency channel groups.

10. The apparatus of claim 9, wherein the at least one memory and the computer program code are configured, with the at least one processor, to cause the apparatus to use the set of channel bonding configurations such that the channel utilisation factors are distributed, according to the set of channel bonding configurations, to the set of frequency channels occupied by the second network node.

11. The apparatus of claim 9, wherein the channel bonding configurations supported by the second network node define a channel structure for each bandwidth supported by the second network node.

12. The apparatus of claim 9, wherein the at least one memory and the computer program code are configured, with the at least one processor, to cause the apparatus to perform said selecting in an order of decreasing bandwidth of channel bonding configurations supported by the first network node.

13. A non-transitory computer readable medium comprising program instructions for causing an apparatus to perform at least the following:
detecting, by a first network node, at least a second network node;
determining, by the second network node, a primary channel of the second network node and a set of channel bonding configurations supported by the second network node, wherein the set of channel bonding configurations defines one or more configurations for combining the primary channel with auxiliary channels;
determining, by the first network node, channel utilisation factors of the second network node for a set of frequency channels by using the set of channel bonding configurations; and
selecting, by the first network node, a primary channel on the basis of the channel utilisation factors,
wherein the first network node performs said selecting by:
forming frequency channel groups from the set of frequency channels such that each frequency channel group has a determined bandwidth;
selecting, amongst the channel utilisation factors of each frequency channel group, the channel utilisation factor associated with the highest channel utilisation to represent the frequency channel group; and
selecting, as the primary channel, a frequency channel of a frequency channel group having a channel utilisation factor associated with the lowest channel utilisation amongst the frequency channel groups.

* * * * *